(12) United States Patent
Ichikawa (10) Patent No.: US 7,113,965 B2
(45) Date of Patent: Sep. 26, 2006

(54) COMPUTER NETWORK SYSTEM INCLUDING AN INFORMATION COLLECTOR COMPUTER

(75) Inventor: Tomihiko Ichikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 544 days.

(21) Appl. No.: 10/660,493

(22) Filed: Sep. 12, 2003

(65) Prior Publication Data

US 2004/0054910 A1 Mar. 18, 2004

(30) Foreign Application Priority Data

Sep. 13, 2002 (JP) ............................. 2002-268754

(51) Int. Cl.
*G06F 17/30* (2006.01)
*G06F 17/00* (2006.01)

(52) U.S. Cl. ...................... 707/204; 707/201

(58) Field of Classification Search ................ 707/201, 707/202, 203, 204, 104.1; 710/36; 714/4; 719/328
See application file for complete search history.

(56) References Cited

U.S. PATENT DOCUMENTS

2003/0149812 A1* 8/2003 Schoenthal et al. ........... 710/36
2003/0233594 A1* 12/2003 Earl .............................. 714/4

* cited by examiner

*Primary Examiner*—Apu Mofiz
(74) *Attorney, Agent, or Firm*—Sughrue Mion, PLLC (57) ABSTRACT

A computer network system includes a plurality of information provider computers, an information collector computer and a communication network for connecting these computers together. The information provider computers store therein a plurality of information sets in connection with respective generation number information including ID codes and version codes. The information collector computer stores therein the information sets in connection with the version codes, periodically or intermittently receives the generation number information, compares the same against corresponding information stored therein, and receives the information set if a corresponding version code is not stored therein.

6 Claims, 7 Drawing Sheets

COMPUTER NETWORK SYSTEM INCLUDING AN INFORMATION COLLECTOR COMPUTER

BACKGROUND OF THE INVENTION (a) Field of the Invention

The present invention relates to a computer network system including an information collector computer and, more particularly, to a computer network system including a plurality of information provider computers, at least one information collector computer and a communication network for connecting these computers.

(b) Description of the Related Art

A network system is known wherein a plurality of units cooperate for processing while monitoring the operating state of each other unit. If these units are connected therebetween by one or more of communication network, the monitoring operation is generally performed while exchanging the data based on a simple network management protocol (SNMP). If these units are computers and the information is stored in the computers, the amount of data to be exchanged between the computers is large to thereby cause a heavy burden on the network as well as the computers. If such a computer network system includes a large number of computers connected via the communication network, the burden on the communication network as well as the computers further increases.

In such a large-scale computer network system, it is not practical to use a single monitoring computer for monitoring the information stored in a large number of other computers, i.e., information provider computers, and thus a plurality of monitoring computers, i.e., information collector computers are used for monitoring the information in a distributed processing. For such a network system, a technique is known wherein if an information provider computer updates the information therein, the information provider computer transmits the updated part of the information to the information collector computer, for reducing the amount of data to be exchanged for the monitoring.

However, there is a problem in such a system that if there are a plurality of information collector computers, each information provider computer must know the presence itself and the addresses of the information collector computers monitoring the each information provider computer. This increases a heavy burden on the each information provider computer which has own task for processing.

SUMMARY OF THE INVENTION

In view of the above, it is an object of the present invention to provide a computer network system including a plurality of information provider computers and at least one information collector computer, which are connected via a network, and capable of reducing the burden on the network and the computer network system as a whole.

The present invention provides a computer network system including a plurality of information provider computers, at least one information collector computer, and a network for connecting the information provider computers and the information collector computer together: each of the information provider computers storing therein updated information in connection with generation number information including a version code thereof, the information collector computer including: a local buffer for storing therein the updated information in connection with the corresponding version codes thereof; a receiving unit for receiving the generation number information from the information provider computers at a specified timing; and a comparator for comparing each version code received at the specified timing against the version codes stored in the local buffer, wherein if one of the version codes in the generation number information received at the specified timing is not stored in the local buffer, the receiving unit receives the updated information corresponding to the one of the version codes from a corresponding one of the information provider computer.

The present invention also provides a method for collecting information by using an information collection computer from a plurality of information provider computers via a communication network, the method including the steps of: storing in each of the information provider computers updated information in connection with generation number information including a version code thereof; storing in the information provider computer the updated information in connection with the corresponding version codes thereof; receiving the generation number information by using the information provider computer from the information provider computers at a specified timing; detecting whether or not each version code received at the specified timing is stored in the information collector computer; and receiving the updated information from one of the information provider computers if a corresponding version code is not stored in the information collector computer.

In accordance with the system and the method of the present invention, the amount of data transmitted between the information collector computer and each of the information provider computers via the network can be reduced for alleviating the burden on the communication network and the information collector computer.

The above and other objects, features and advantages of the present invention will be more apparent from the following description, referring to the accompanying drawings.

PREFERRED EMBODIMENTS OF THE INVENTION

Figure 1:
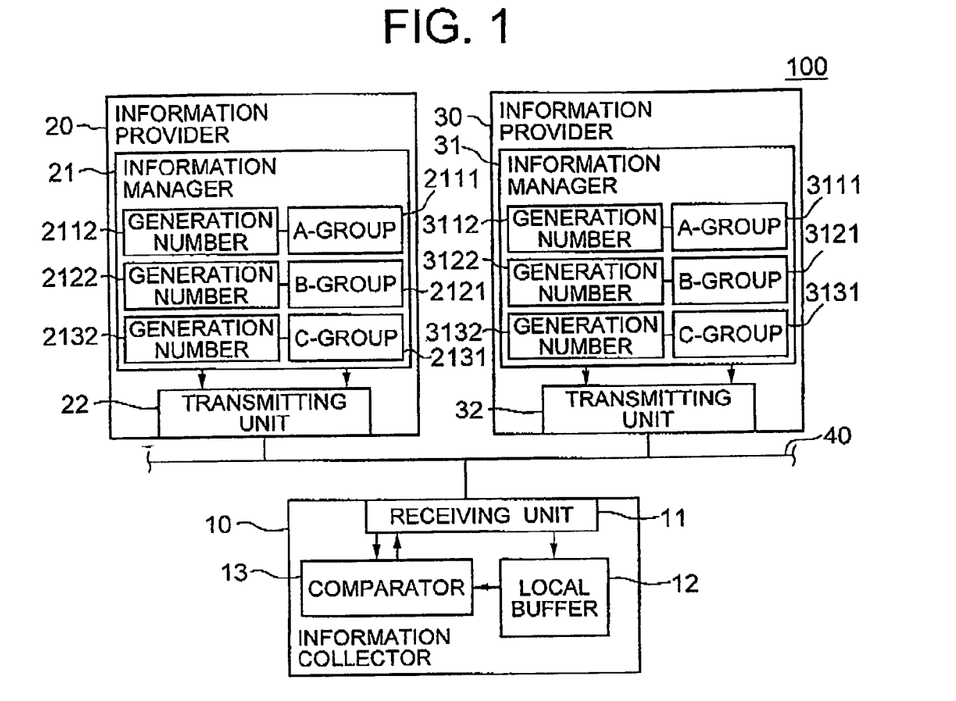
FIG. 1 is a functional block diagram of a computer network system according to a first embodiment of the present invention.

Referring to FIG. 1, a computer network system, generally designated by numeral 100, according to a first embodiment of the present invention includes at least one information collector computer 10, a plurality of information provider computers 20 and 30, and a communication network 40 connecting these computers 10, 20 and 30 together. It is to be noted that the number of information collector computers 10 and the number of information provider computers 20 and 30 are not limited to any numbers, and should depend on the system desired.

The information collector computer 10 includes a receiving unit 11 for receiving and collecting information from any of the information provider computers 20 and 30 through the communication network 40, a local buffer 12 for storing therein the information received by the receiving unit 11, and a comparator 13 for comparing the ID/version code of the information stored in the information provider computer 20 or 30 against the ID/version code of the corresponding information stored in the local buffer 12. The term "version" as used herein may include a major version and a minor version, wherein the major version information may be specified by most significant bits of the version code, and the minor version information may be specified by the least significant bits thereof.

Figure 2:
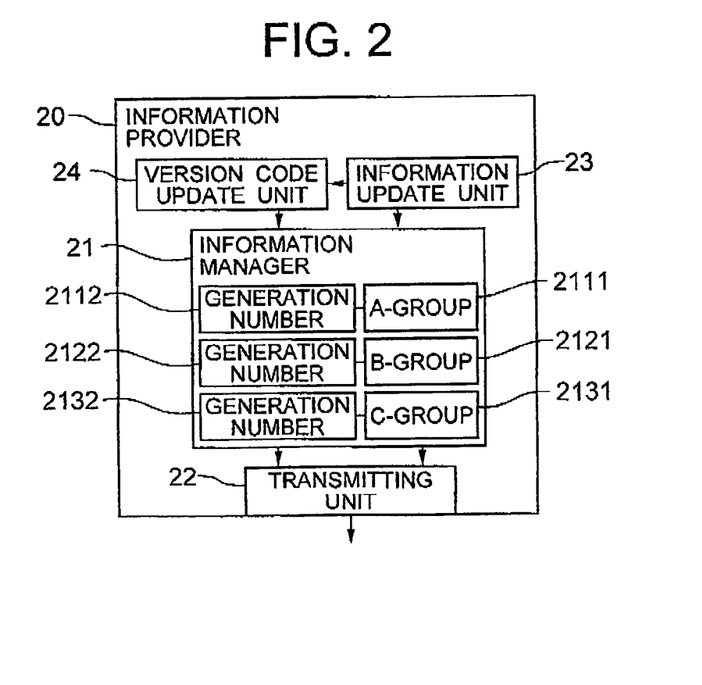
FIG. 2 is a detailed functional block diagram of the information provider computer shown in FIG. 1.

Referring to FIG. 2, the information provider computer 20 includes an information manager 21, a transmitting unit 22, an information update unit 23 and a version code update unit 24. The information manager 21 manages the information in the information provider computer 20 as to the operating state thereof while separating the information into A-group information (A-group information set) 2111, B-group information 2121 and C-group information 2131 based on the update frequency thereof. For example, the separation is such that the A-group information 2111 has a lowest update frequency, the B-group information 2121 has a medium update frequency and the C-group information 2131 has a highest update frequency. In addition, each group information set 2111, 2121 or 2131 has generation number information 2112, 2122 or 2132 including an ID code of the group information, which identifies the each group information set, and a version code which identifies the version of the each group information set. Other information provider computers such as 30 have similar configurations.

Figure 3:
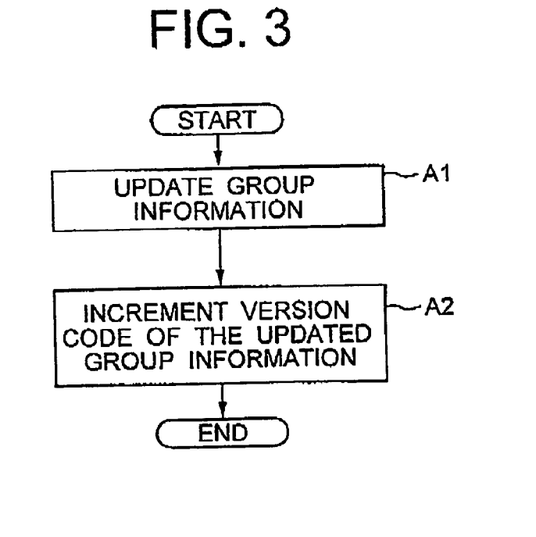
FIG. 3 is flowchart of the processing by the information provider computer of FIG. 2.

When the information provider computer 20 (or 30) stores a new group information set, the information provider computer 20 registers therein the new group information in association with the ID code and a version code, i.e., zero. Referring to FIG. 3 showing the procedure of the information provider computer 20 (or 30), when a group information set stored in the information provider computer 20 is updated, the corresponding version code is also updated or incremented following the update of the group information. The information collector computer 10 receives all the updated group information from the information provider computers 20 and 30, to store the same in association with the ID codes and version codes thereof. The information collector sever 10 intermittently or periodically operates for receiving all the updated group information from the information provider computers 20 and 30.

Figure 4:
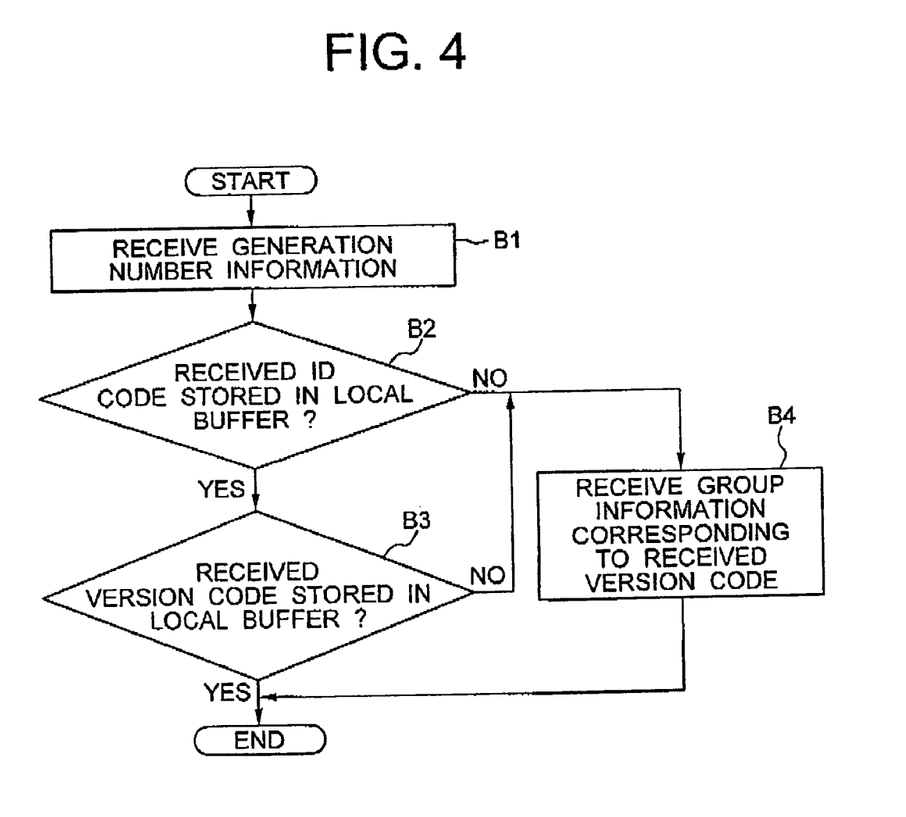
FIG. 4 is a flowchart of the processing by the information collector computer shown in FIG. 1.

More specifically, the receiving unit 11 of the information collector computer 10 first reads all the ID codes and version codes of the information from the information provider computers 20 and 30 (step B1). Then, the comparator 13 compares the ID code and version code received by the receiving unit 11 against the ID code and version code, respectively, already stored in the local buffer 12. If it is judged in the comparison that the version code is updated in the information provider computer 20 or 30, the receiving unit 11 receives the group information corresponding to the updated version code. On the other hand, if it is judged in the comparison that the version code is not updated in the information provider computer 20, the receiving unit 11 of the information collector computer 10 does not receive the group information corresponding to the non-updated version code.

FIGS. 3 and 4 show the procedure of the information provider computer 20 (or 30) and the procedure of the information collector computer 10, respectively. In FIG. 3, when the information provider computer 20 detects a change in the computer 20, such as a change of data therein or the operating state thereof, during the own processing, the information update unit 23 updates the information stored in the information manager 11 for each group information set based on the change (step A1). Subsequently, the version code update unit 24 increments the version code corresponding to the updated group information (step A2).

In FIG. 4, the receiving unit 11 of the information collector computer 10 intermittently or periodically receives the generation number information to read the ID code and version code of each group information set stored in the information provider computers 20 and 30 via the communication network 40 (step B1). The ID code may be a file number of the group information, or an original version code of the group information, which is determined upon the initial registry of the group information and from which each version code derives or originates.

Subsequently, the comparator 13 of the information collector computer 10 compares the ID code in the generation number information received from the information provider computer 20 or 30 against the ID codes stored in the local buffer 12 to detect whether or not the received ID code coincides with one of the stored ID codes (step B2). If it is judged that the received ID code coincides with one of the stored ID codes, the comparator 13 further compares the received version code against the version code of the group information stored in the local buffer 12 and having the one of the ID codes (step B3).

If the received ID code is not stored in the local buffer 12 or if the received version code does not coincide with the corresponding stored version code, the information collector computer 10 receives the group information corresponding to the received ID code and version code (step B4). Upon the receipt, the receiving unit 11 receives the group information via the transmitting unit 22 or 32 and communication network 40. On the other hand, if the received ID code and received version code coincide with one of the stored ID codes and the corresponding stored version code, respectively, in steps B2 and B3, the information collector computer 10 finishes the processing without receiving the corresponding group information.

Figure 5A:
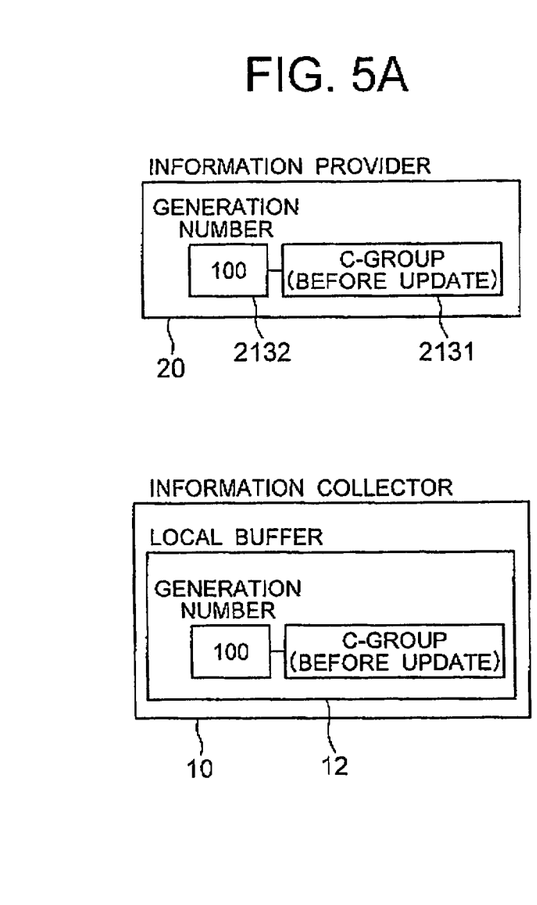
FIGS. 5A to 5C are schematic diagrams showing the contents of data stored in the information provider computer and information collector computer shown in FIG. 1 during consecutive states thereof.
Figure 5B:
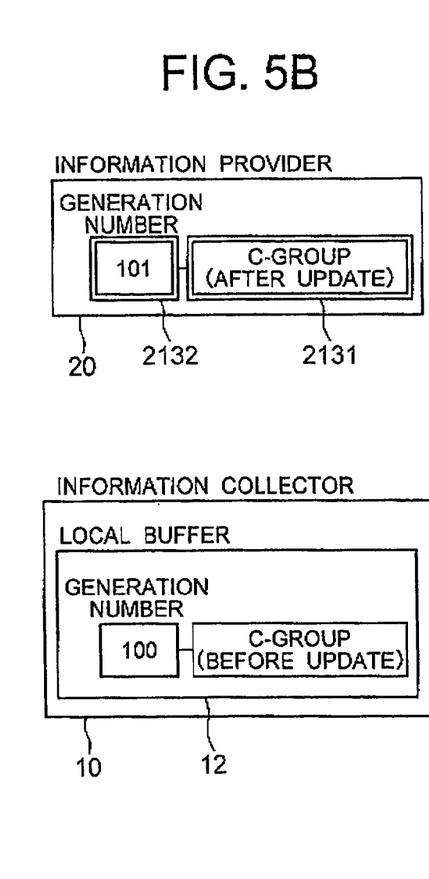
Figure 5C:
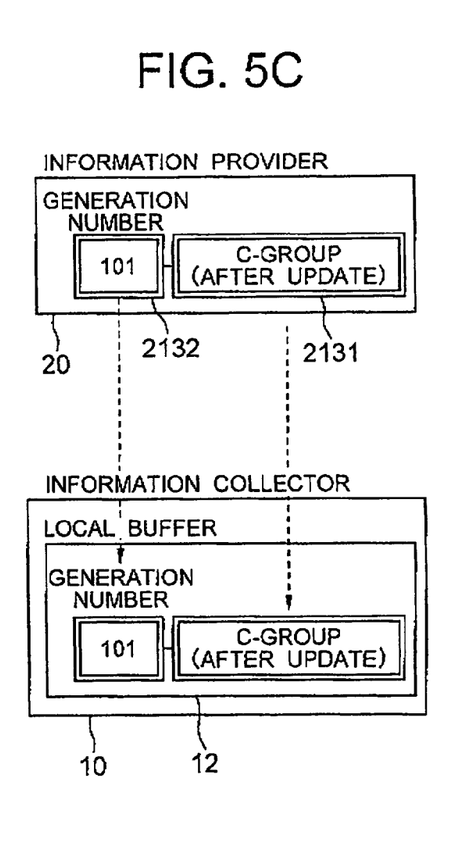

Referring to FIGS. 5A to 5C, there are shown data stored in the information provider computer 20 and the information collector computer 10 during consecutive steps in the computer network system of FIG. 1. FIG. 5A shows an initial stage of the system wherein the information provider computer 20 stores therein, together with other group information, C-group information 2131 in association with the generation number information 2132 including an ID code and a version code, "100", and wherein the information collector computer 10 stores therein a copy of the C-group information 2131 as well as a copy of the generation number information 2132 including an ID code and a version code, "100", which coincides with the version code, "100", stored in the information provider computer 20.

In FIG. 5B, upon a change of the operating state in the information provider computer 20 during the processing thereof, the information update unit 23 updates the C-group information 2131 after detecting the change of data therein (step A1 in FIG. 3). The version code update unit 24 then updates the version code of the generation number information 2131 by incrementing the version code from "100" to "101" (step A2 in FIG. 3).

In FIG. 5B, upon a timing for collection of information by the information collector computer 10, the receiving unit 11 of the information collector computer 10 receives and reads all the generation number information stored in the information provider computers 20 and 30 (step B1 in FIG. 4). The received generation number information includes the generation number information 2132 including the ID code and version code, "101", which corresponds to the updated C-group information 2131.

The comparator 24 detects an inequality between the updated version code, "101" of the generation number information 2132 stored in the information provider computer 20 and the copy of the non-updated version code, "100", stored in the information collector computer 10 (step B3 in FIG. 4). Thus, as shown in FIG. 5C, the information collector computer 10 receives the C-group information 2131 corresponding to the generation number information 2132, and stores a copy of the C-group information 2131 in association with a copy of the generation number information 2132 including the version code, "101" in the local buffer 12 (step 134 in FIG. 4).

After a specified time length elapses to enter another information collection timing, the information collector computer 10 again receives the generation number information, such as 2312, stored in the information provider computers 20 and 30 (step B1 in FIG. 4). Since the received generation number information 2132 including the version code, 101, coincides with the generation number information 2132 stored in the information collector computer 10, the information collector computer 10 finishes the receiving procedure without receiving the corresponding group information 2131.

In the above embodiment, since the group information itself is not transmitted between the information provider computer 20 and the information collector computer 10 if the group information is not updated, the amount of data transmitted therebetween can be reduced to save the amount of processing by the communication network and the information collector computer 10.

Figure 6:
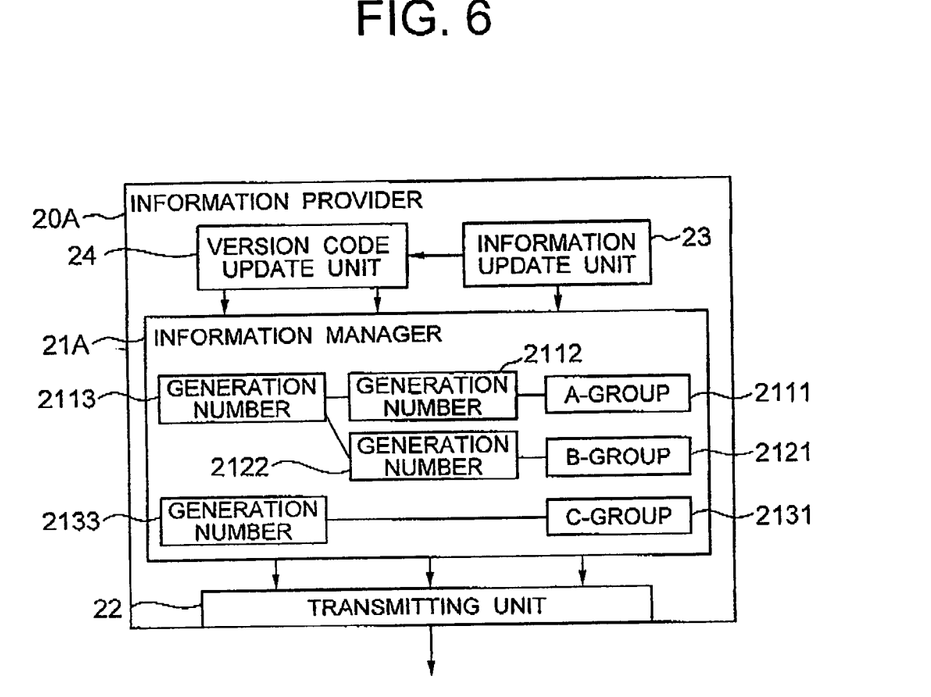
FIG. 6 is a functional block diagram of a computer network system according to a second embodiment of the present invention.

Referring to FIG. 6, there is shown an information provider computer 20A disposed in a computer network system according to a second embodiment of the present invention. The information collector computer (10) in the present embodiment is similar to the information collector computer 10 in the first embodiment. Basically, the information provider computer 20A of the present embodiment is similar to the information provider computer 20 in the first embodiment except that the information manager 21A in the present embodiment stores therein a plurality of generation number information sectors including a major information sector 2113 and minor information sectors 2112 and 2122 for defining the generation number information of the A-group information (subset) 2111 and B-group information (subset) 2121. A-group information subset 2111 and B-group information subset 2121 having a common generation number information sector 2113 configure an information set. The information manager 21A stores therein a single generation number information sector (major information sector) 2133 for the C-group information (set), which is generally updated less frequently compared to the A- and B-group information 2111 and 2121.

In the present embodiment, if the A-group information 2111 is updated, for example, the version code of the minor information sector 2112 is incremented, and the version code of the major information sector 2113 is also incremented responding to the increment of the minor information sector 2112. On the other hand, if the C-group information 2131 is updated, the single information sector (major information sector) 2133 is incremented.

Figure 7:
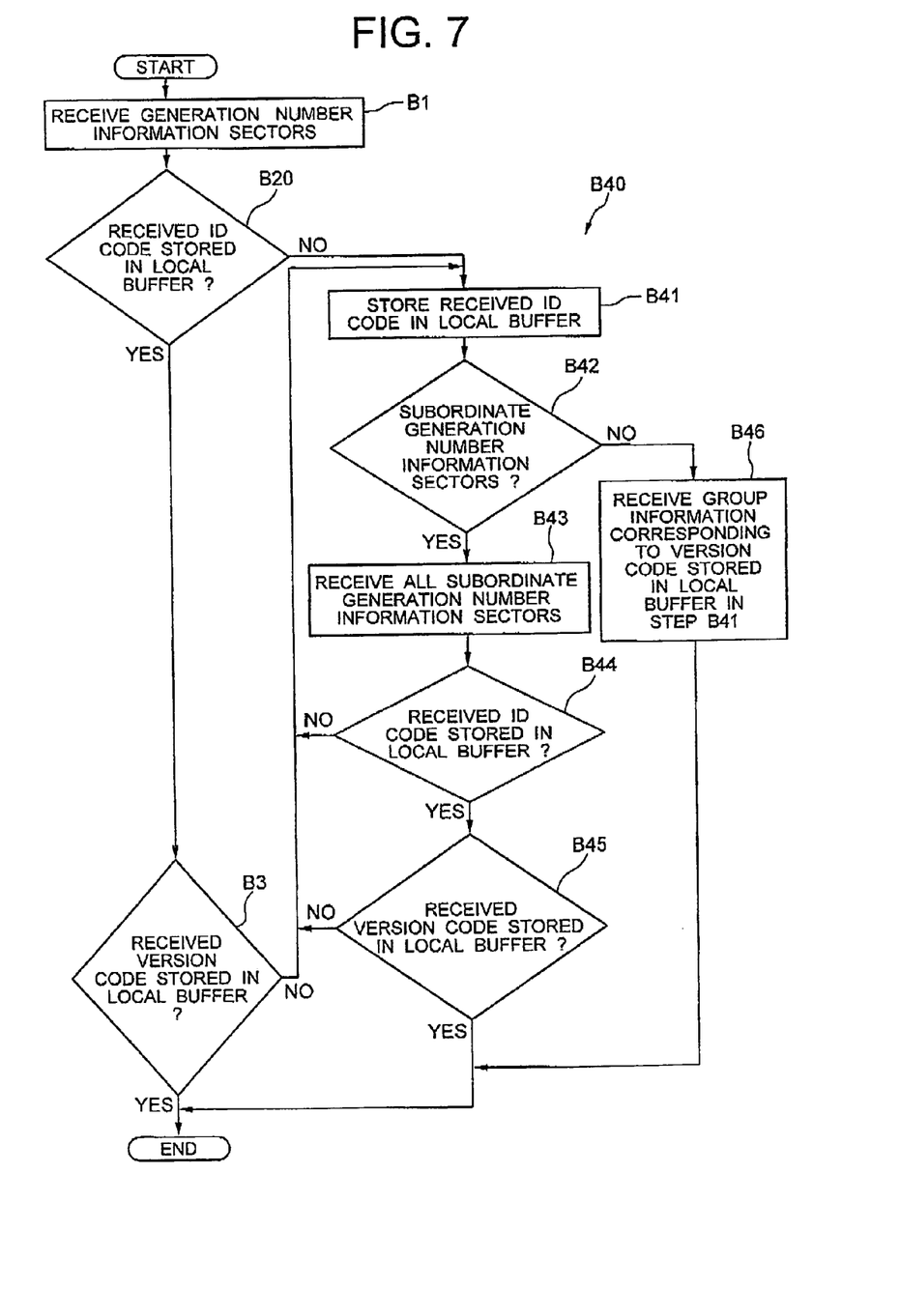
FIG. 7 is a flowchart of the computer network system of FIG. 6.

The procedure of the information collector computer 10 is shown in FIG. 7, which is similar to FIG. 4 except for steps B20 and B40 conducted in the present embodiment. The step B20 in the present embodiment is such that it is examined based on the ID codes whether or not the version codes of the received major information sectors coincide with those stored in the local buffer 12. If it is judged in step B20 that all the version codes of the received major information sectors coincide with those stored in the local buffer 12, then the procedure advances to step B3, wherein the information collector computer 10 finishes the procedure without receiving the group information.

If it is judged in step B20 or B3 that any of the ID codes or version codes of the received major information sectors does not coincide with those stored in the local buffer 12, the procedure advances to procedure B40. The information collector sever 10 stores therein the ID code and version code of the received major information sectors which does not coincide with those stored in the local buffer 12 (step B41). Subsequently, it is judged in step B42 whether or not a subordinate information sector, which is subordinate to the stored major information sector, is stored in the information provider computer 20A. If it is affirmative, the information collector computer 10 receives all the subordinate information sectors (step B43), and compares the ID code and version code of each subordinate information sector against all the ID codes and version codes stored in local buffer 12 (step B44).

If it is judged in step B44 that the ID code of the subordinate information sector coincides with one of the ID codes stored in the local buffer 12, the procedure advances to step B45 wherein it is examined whether or not the version code of the subordinate information sector coincides with one of the version codes stored in the local buffer 12. If it is affirmative in step 1345, the information collector computer 10 finishes the procedure without receiving the group information. If it is negative in step B45 or step 1344, the procedure returns to step B41, wherein the subordinate version code sector which does not coincide with those stored in the local buffer is stored in the local buffer 12. If it is judged in step B42 that there is no remaining subordinate version code sector, the information collector computer 10 now receives all the group information which correspond to the subordinate information sectors stored in step B41.

The above procedure will be further detailed with reference to FIGS. 8A to 8D illustrating the data stored in the information provider computer 20A and the information collector computer 10. It is assumed, as shown in FIG. 5A, that the information provider computer 20A stores therein information including two groups of information including A-group information 2111, B-group information 2121 and other group information.

Figure 8A:
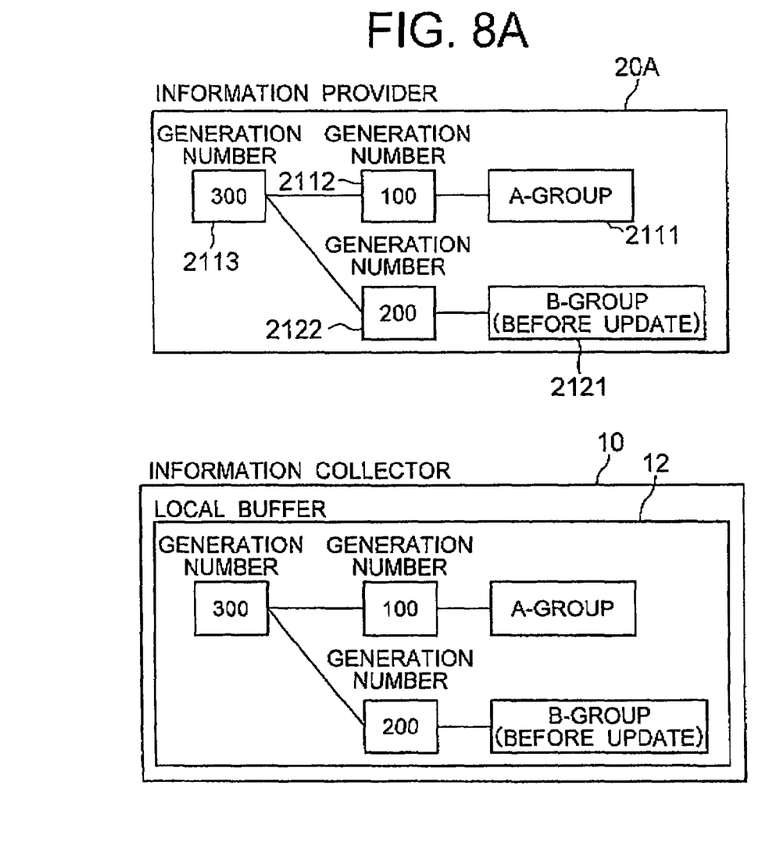
FIGS. 8A to 8D are schematic diagrams showing the contents of data stored in the information provider computer and information collector computer shown in FIG. 6 during consecutive states thereof.

The A-group information 2111 is associated with a minor generation number information sector 2112 including a minor version code, "100", and a major generation number information sector 2113 including a major version code, "300". The B-group information 2121 is associated with a minor generation number information sector 2122 including a minor version code, "200", and the major generation number information sector 2113. Copies of these generation number information sectors 2112, 2122 and 2133 including the ID codes and version codes are stored in the information collector computer 10.

Figure 8B:
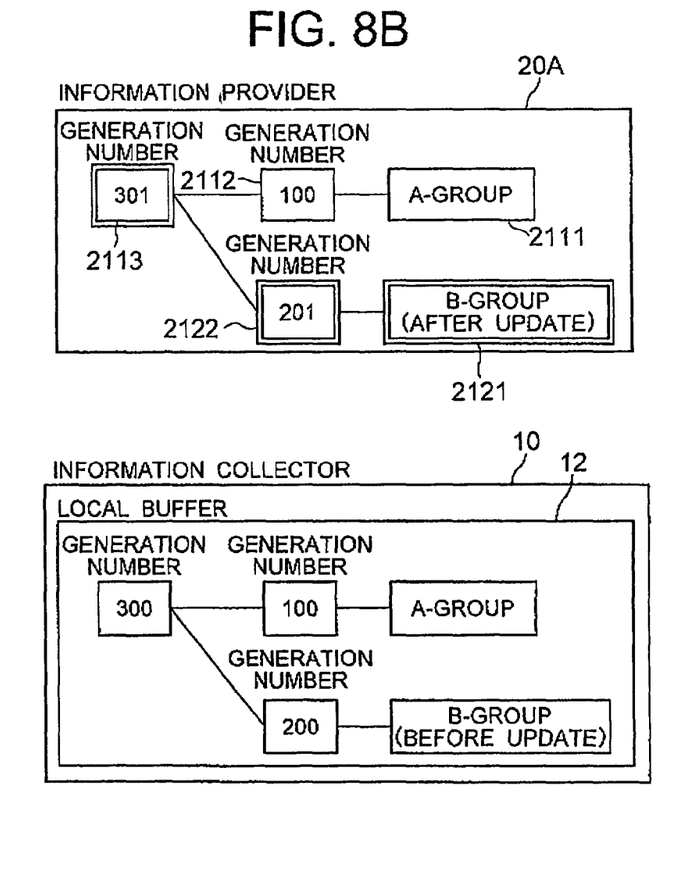

As shown in FIG. 8B, the information provider computer 20A updates the B-group information 2121 due to a change in the operating state thereof, whereby the minor version code in the generation number information sector 2122 is incremented from "200" to "201", and the major version code in the generation number information sector 2113 is incremented from "300" to "301".

At a timing of the information collection, the information collector computer 10 receives the generation number information sector 2113 (step B1). Since it is judged in step B20 that the ID code of the generation number information sector 2113 is stored in the local buffer 12 of the information collector computer 10, the comparator 13 of the information collector computer 10 compares the major version code, "301", in the generation number information sector 2113 against the version code, "300", stored in the information collector computer 10, thereby detecting a disagreement therebetween (step B3). Thus, the information collector computer 10 stores the received version code, "301", in the local buffer 12 (step B41).

Figure 8C:
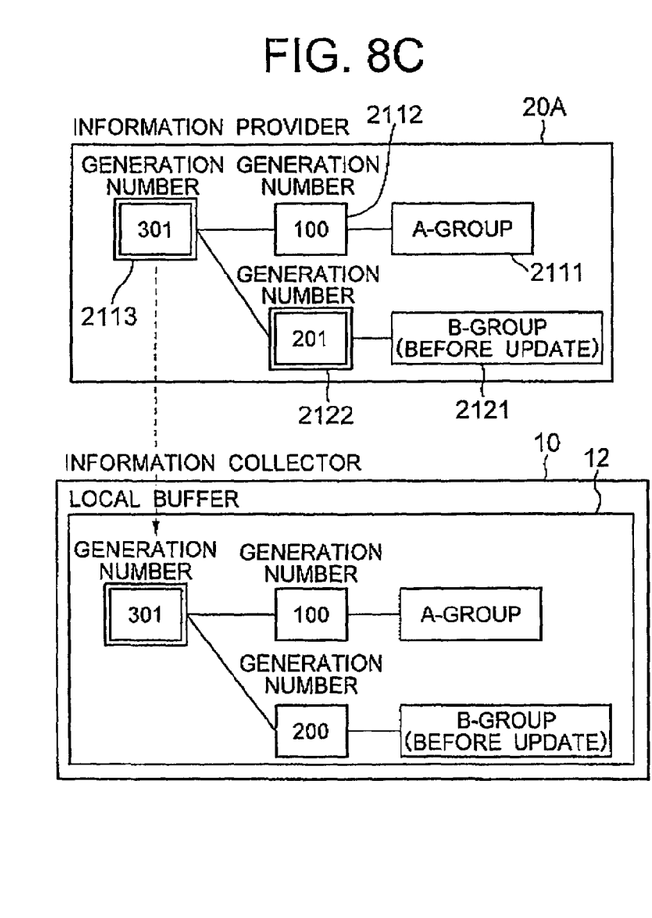

In FIG. 8C, the information collector computer 10 then detects the subordinate information sectors 2112 and 2122 which are subordinate to the stored information sector 2113, receives the same (steps B42 and B43), and starts for the operation in connection with the generation number information sector 2112, Since it is judged in step B44 that a copy of the generation number information sector 2112 is stored in the local buffer 12, and the version code thereof is "100", the information collector computer 10 finishes the procedure for the generation number information sector 2112.

Figure 8D:
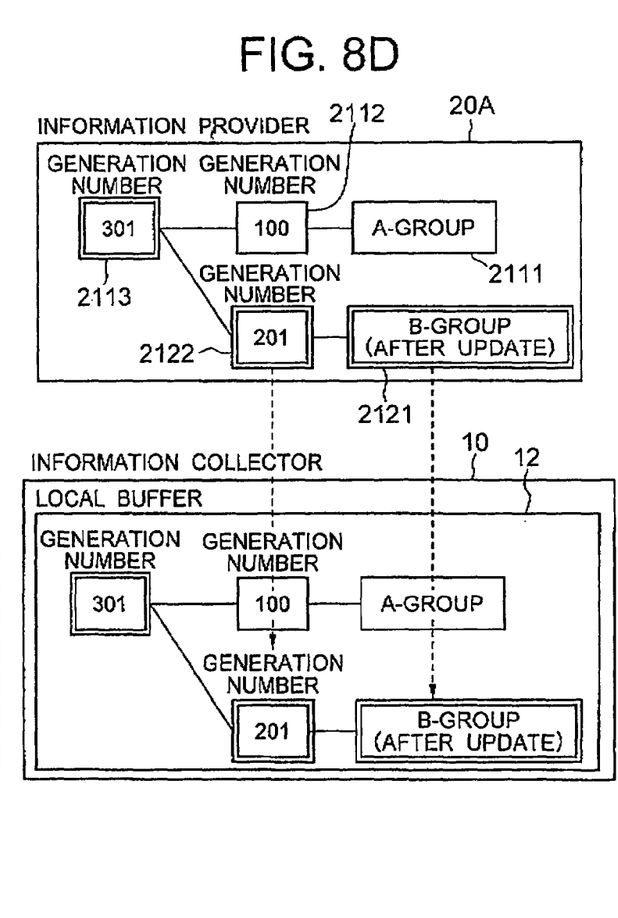

In FIG. 8D, the information collector computer 10 then starts for the operation in connection with the generation number information sector 2122. Although generation number information sector 2122 is stored in the information collector computer 10, the new version code thereof, 201" in the information provider computer 20A is not stored in the information collector computer 10 (step B45). Thus, the process returns to step B41, wherein the information collector computer 10 stores the version code, "201", of the generation number information sector 2122 in the local buffer 12.

Since it is judged in step B42 that there is no remaining subordinate generation number information sector, the information collector computer 10 receives the B-group information corresponding to the generation number information sector 2122, and stores the same in the local buffer 12 (step B46), thereby finishing the information collection.

Upon a next timing for the information collector computer 10 to receive the information from the information provider computers, the information collector computer 10 receives, from the information collector computer 20A, the generation number information sector 2113 including the version code, "301", which is stored in the information collector computer 10 (steps B20 and B3). Thus, the information collector computer 10 finishes the receiving operation at this stage without receiving the group information.

In the present embodiment, since the ID codes as well as the version codes are separated into a plurality of generation number information sectors, the amount of data to be received by the information collector computer can be reduced compared to the first embodiment so long as the group information has not been updated.

The present invention can be applied to any computer network system, wherein a plurality of computers are connected via at least one communication network. For example, the present invention can be suitably applied to a multi-processor system wherein a plurality of computers are connected and an information collector computer monitors the load of each computer for allocating the task to the each computer based on the load thereof. In such a system, for example, the A-group information includes the architecture or organization of the computer, B-group information includes the current load of the peripheral devices of the computer, and the C-group information includes the load of the computer itself. If it is detected based on the B- or C-group information that the current load for a peripheral device or the computer is heavy, the next task to be allocated to the device or computer is allocated to another peripheral device or another computer to distribute the burden on the entire system.

The information collector computer may collect the information periodically at a specified interval, intermittently, e.g., at the timing of end of a task, or by responding to an instruction for the collection. The generation number information stored in the information provider computer or information collector server may include only a version code. In such a case, the information collector computer may compare the version code stored in the information provider computer against the version codes stored in the information collector computer before determining whether or not the information is to be received.

Since the above embodiments are described only for examples, the present invention is not limited to the above embodiments and various modifications or alterations can be easily made therefrom by those skilled in the art without departing from the scope of the present invention.

What is claimed is:

1. A computer network system comprising a plurality of information provider computers, at least one information collector computer, and a network for connecting said information provider computers and said information collector computer together, each of said information provider computers storing therein updated information in connection with generation number information including a version code thereof, said information collector computer comprising: a local buffer for storing therein said updated information in connection with corresponding said version codes thereof; a receiving unit for receiving said generation number information from said information provider computers at a specified timing; and a comparator for comparing each said version code received at said specified timing against said version codes stored in said local buffers wherein:

if one of said version codes in said generation number information received at said specified timing is not stored in said local buffer, said receiving unit receives said updated information corresponding to said one of said version codes from a corresponding one of said information provider computer.

2. The computer network system according to claim 1, wherein said generation number information includes an ID code and said version code.

3. The computer network system according to claim 1, wherein said information provider computer separates said information into a plurality of information sets, and stores said information sets in connection with respective generation number information.

4. The computer network system according to claim 3, wherein said generation number information includes an ID code and said version code of each of said information sets.

5. The computer network system according to claim 3, wherein at least one of said information sets includes a plurality of subsets, which are stored in connection with respective generation number information sectors.

6. The computer network system according to claim 3, wherein said separation of said information is based on an update frequency of said information set.

* * * * *